(12) United States Patent
Zhao et al.

(10) Patent No.: US 11,484,913 B2
(45) Date of Patent: Nov. 1, 2022

(54) GAS-SOLID FLUIDIZED BED DRY BENEFICIATION PROCESS USING BENEFICIATION DENSITY GRADIENT

(71) Applicant: CHINA UNIVERSITY OF MINING AND TECHNOLOGY, Jiangsu (CN)

(72) Inventors: Yuemin Zhao, Jiangsu (CN); Jesse Zhu, Jiangsu (CN); Chenyang Zhou, Jiangsu (CN); Zhijie Fu, Jiangsu (CN); Zhenfu Luo, Jiangsu (CN); Chenlong Duan, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 0 days.

(21) Appl. No.: 17/598,890

(22) PCT Filed: Feb. 29, 2020

(86) PCT No.: PCT/CN2020/077335
§ 371 (c)(1),
(2) Date: Sep. 28, 2021

(87) PCT Pub. No.: WO2020/199818
PCT Pub. Date: Oct. 8, 2020

(65) Prior Publication Data
US 2022/0176411 A1    Jun. 9, 2022

(30) Foreign Application Priority Data

Mar. 29, 2019 (CN) .......................... 201910250067.3

(51) Int. Cl.
*B01J 8/24* (2006.01)
*B07B 7/01* (2006.01)

(52) U.S. Cl.
CPC .. *B07B 7/01* (2013.01); *B01J 8/24* (2013.01)

(58) Field of Classification Search
CPC .. B07B 7/01; B07B 11/02; B07B 11/04; B01J 8/24
(Continued)

(56) References Cited

U.S. PATENT DOCUMENTS

2007/0193926 A1    8/2007  Ness et al.

FOREIGN PATENT DOCUMENTS

| CN | 1161884 | 10/1997 |
|---|---|---|
| CN | 102921636 | 2/2013 |

(Continued)

OTHER PUBLICATIONS

"International Search Report (Form PCT/ISA/210) of PCT/CN2020/077335," dated May 15, 2020, with English translation thereof, pp. 1-4.
(Continued)

*Primary Examiner* — Huy Tram Nguyen
(74) *Attorney, Agent, or Firm* — JCIP Global Inc.

(57) ABSTRACT

Provided is a gas-solid fluidized bed dry beneficiation process using a beneficiation density gradient, including: in a dry beneficiation system of a gas-solid fluidized bed, selecting coarse particles and fine particles; placing the coarse particles at a bottom of the dry beneficiation system, and placing the fine particles above the coarse particles, wherein the coarse particles and the fine particles are separated under an initial condition; under an effect of a gas flow, the coarse particles and the fine particles being fluidized to form a high-density beneficiation region and a low-density beneficiation region, respectively, and the coarse particles and the fine particles being mixed at a contact interface to form an intermediate-density beneficiation region; and feeding minerals to be beneficiated from an upper portion of the dry beneficiation system to pass through the low-density beneficiation region, the intermediate-density beneficiation
(Continued)

region, and the high-density beneficiation region in sequence.

10 Claims, 1 Drawing Sheet

(58) Field of Classification Search
USPC .................................................. 209/139.1
See application file for complete search history.

(56) References Cited

FOREIGN PATENT DOCUMENTS

| | | |
|---|---|---|
| CN | 105214956 | 1/2016 |
| CN | 106622965 | 5/2017 |
| CN | 107233995 | 10/2017 |
| CN | 110293056 | 10/2019 |
| GB | 1604418 | 12/1981 |

OTHER PUBLICATIONS

Office Action of China Counterpart Application, dated May 29, 2020, pp. 1-4.
Office Action of China Counterpart Application, dated Jan. 15, 2021, pp. 1-5.
Office Action of China Counterpart Application, dated May 18, 2021, pp. 1-4.

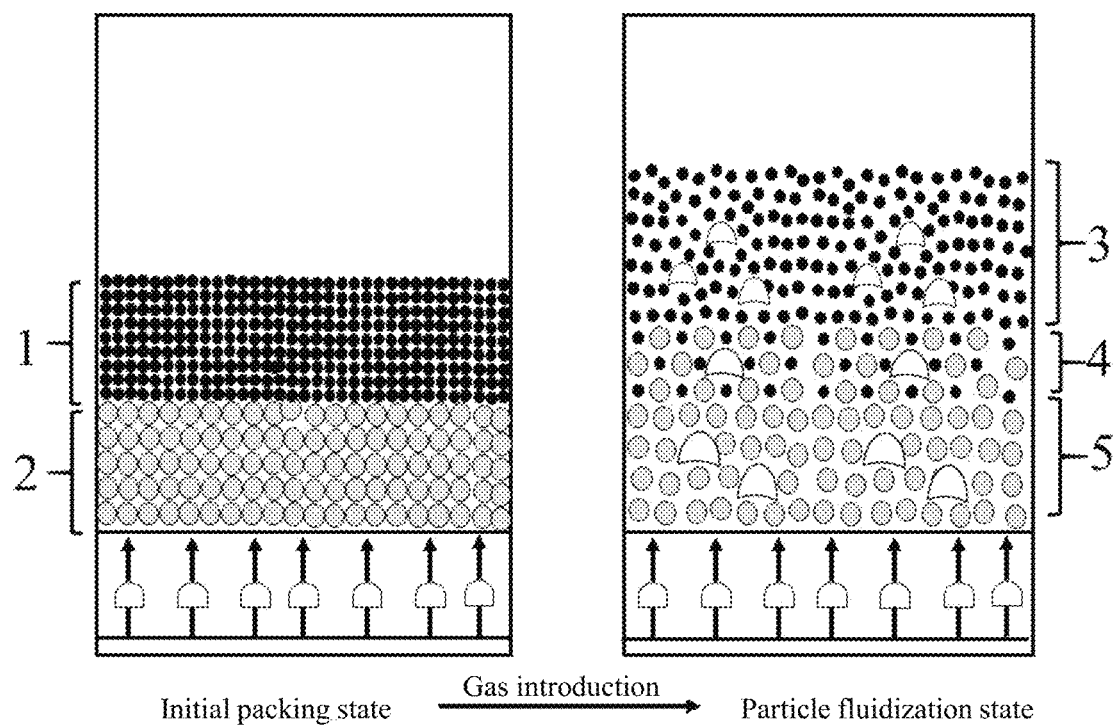

GAS-SOLID FLUIDIZED BED DRY BENEFICIATION PROCESS USING BENEFICIATION DENSITY GRADIENT

CROSS-REFERENCE TO RELATED APPLICATION

This application is a 371 of international application of PCT application serial no. PCT/CN2020/077335, filed on Feb. 29, 2020, which claims the priority benefit of China application no. 201910250067.3, filed on Mar. 29, 2019. The entirety of each of the above mentioned patent applications is hereby incorporated by reference herein and made a part of this specification.

BACKGROUND

Technical Field

The present invention relates to a mineral processing method, and belongs to the technical field of dry mineral beneficiation, and in particular, relates to a gas-solid fluidized bed dry beneficiation process using a beneficiation density gradient.

Description of Related Art

Coal is one of the important basic energy sources in the world, and has a significant role in promoting the development of the world economy. The huge consumption and yield of coal have brought severe challenges to the living environment and ecological security of people. Environmental problems such as "smog" and "acid rain" have aroused widespread concern from governments and people.

Coal beneficiation is a basis for clean utilization of coal, and plays an important role in improving the quality of coal products and in pre-treatment upgrading of coal before combustion. With the increasing shortage of water resources, the gas-solid fluidized bed dry beneficiation technology has attracted the attention of scholars from China, Canada, Japan, India, Australia, and other countries. The gas-solid fluidized bed dry beneficiation technology mainly uses magnetite minerals as a dense medium, a fluid with a certain density is formed under the effect of a gas flow, and minerals to be beneficiated are separated according to the density to form light products and heavy products, thus having advantages such as a simple process and high beneficiation precision, and providing an important way for processing and utilization of coal beneficiation. At present, a traditional gas-solid fluidized bed beneficiation machine mixes two kinds of particles with similar aerodynamic diameters to adjust a beneficiation density, and a single beneficiation density is formed in a beneficiation system. Due to the complex density composition of the minerals to be beneficiated, the minerals close to the beneficiation density are prone to mismatching, which reduces the beneficiation efficiency and reduces the quality of products. Chinese invention patent application No. CN1161884 disclosed a method and an apparatus for beneficiating three products using a double-density layer air dense medium fluidized bed, which is mainly used to achieve the purpose of producing three different minerals. However, it is not difficult to find that adjustment of a low density and a high density mainly depends on selecting the density and size of particles, without considering the use of particulate expansion characteristics of the particles to optimize the adjustment of the beneficiation density. The fluidized bed used in the beneficiation is a conical inclined surface design with an inclination angle of 60°-80°, which will increase the possibility of forming a spouted bed, and is not conducive to the beneficiation of minerals. The beneficiation density is mainly divided into a high-density beneficiation region formed by heavy and large particles and a low-density beneficiation region formed by light and small particles. The density gradient has a certain limitation.

SUMMARY

An objective of the present invention is to overcome the shortcomings of the prior art and provide a dry beneficiation system of a gas-solid fluidized bed using a beneficiation density gradient. Coarse particles and fine particles are selected as beneficiation media, and by means of a density gradient formed by fluidizing the coarse and fine particles, the mineral beneficiation efficiency is improved.

In order to achieve the above objective, a gas-solid fluidized bed dry beneficiation process using a beneficiation density gradient is provided in the present invention, including: in a dry beneficiation system of a gas-solid fluidized bed, selecting coarse particles and fine particles as beneficiation media, wherein an aerodynamic diameter of the coarse particles is greater than an aerodynamic diameter of the fine particles, and an aerodynamic diameter ratio of the coarse particles to the fine particles is not greater than 10; placing the coarse particles at a bottom of the dry beneficiation system of the gas-solid fluidized bed, and placing the fine particles above the coarse particles, wherein the coarse particles and the fine particles are in a completely separated state under an initial condition; under an effect of a gas flow, the coarse particles and the fine particles beginning to be fluidized to form a high-density beneficiation region and a low-density beneficiation region, respectively, and the coarse particles and the fine particles being in a mixed state at a contact interface to form an intermediate-density beneficiation region; and feeding minerals to be beneficiated from an upper portion of the dry beneficiation system of the gas-solid fluidized bed to pass through the low-density beneficiation region, the intermediate-density beneficiation region, and the high-density beneficiation region in sequence, to complete a beneficiation of the minerals.

Preferably, a size of the coarse particles and a size of the fine particles are not greater than 500 μm, and the size of the coarse particles is greater than the size of the fine particles, and the size of the coarse particles is uniform or non-uniform, and the size of the fine particles is uniform or non-uniform, and a density of the coarse particles is not less than a density of the fine particles. The size and the density of the coarse particles and the size and the density of the fine particles are determined according to requirements of a beneficiation density.

Preferably, an initial height of the coarse particles and an initial height of the fine particles are 20-100 cm; and more preferably, the initial height of the coarse particles and the initial height of the fine particles are 20-50 cm.

Preferably, a minimum fluidization velocity of the coarse particles is greater than a minimum fluidization velocity of the fine particles, and a terminal velocity of the coarse particles is greater than a terminal velocity of the fine particles.

Preferably, an operating gas velocity is higher than a minimum fluidization gas velocity of the coarse particles and lower than the terminal velocity of the fine particles, and the operating gas velocity is 60% of a difference between the terminal velocity of the fine particles and the minimum fluidization velocity of the coarse particles.

Preferably, a particle size of the minerals to be beneficiated is not greater than 300 mm, and more preferably, the particle size of the minerals to be beneficiated is 0.5-100 mm.

Preferably, in the dry beneficiation system of the gas-solid fluidized bed, a density adjustment range of a beneficiation bed is 1.0-2.6 g/cm$^3$, and more preferably, the density adjustment range of the beneficiation bed is 1.3-2.0 g/cm$^3$.

A fluid for fluidizing medium particles may include a series of gases such as air, carbon dioxide, and nitrogen, and preferably include air.

Compared with the traditional gas-solid fluidized bed dry beneficiation technology, the present invention strengthens the beneficiation of minerals through the density gradient (high density, intermediate density, and low density) formed by the fluidization of the coarse and fine particles, which can improve the accuracy of beneficiation, and realize high-efficient dry beneficiation of coal. In addition, the apparatus of the present invention does not use water, and is simple in operation and maintenance, pollution free, and low in investment and operating costs, thus having significant economic and social benefits.

BRIEF DESCRIPTION OF THE DRAWINGS

FIGURE is a schematic diagram of a dry beneficiation system of a gas-solid fluidized bed using a beneficiation density gradient to enhance mineral beneficiation according to the present invention.

FIGURE, 1—fine particles; 2—coarse particles; 3—low-density beneficiation region; 4—intermediate-density beneficiation region; and 5—high-density beneficiation region.

DESCRIPTION OF THE EMBODIMENTS

In order to better understand the present invention, description is made below with reference to the accompanying drawings and examples.

As shown in FIGURE, in a dry beneficiation system of a gas-solid fluidized bed, coarse particles 2 and fine particles 1 are selected as beneficiation media, an aerodynamic diameter of the coarse particles 2 is greater than an aerodynamic diameter of the fine particles 1, and an aerodynamic diameter ratio of the coarse particles 2 to the fine particles 1 is not greater than 10 (the aerodynamic diameter is directly related to a sedimentation behavior of particles, and reflects hydrodynamic characteristics of the coarse particles and the fine particles. The aerodynamic diameter is defined as a diameter of a sphere with a unit density (1 g/cm$^3$), while moving in still air at a low Reynolds number, reaching the same final settling velocity as the actual particle). The coarse particles 2 are placed at a bottom of the dry beneficiation system of the gas-solid fluidized bed, the fine particles 1 are placed above the coarse particles 2, and the coarse particles 2 and the fine particles 1 are in a completely separated state under an initial condition. Under the effect of a gas flow, the coarse particles 2 and the fine particles 1 begin to be fluidized to form a high-density beneficiation region 5 and a low-density beneficiation region 3, respectively. The coarse particles 2 and the fine particles 1 are in a mixed state at a contact interface to form an intermediate-density beneficiation region 4. A beneficiation density of the low-density beneficiation region 3 is less than a density required for beneficiation of the minerals to be beneficiated, a beneficiation density of the intermediate-density beneficiation region 4 is close to the density required for the beneficiation of the minerals to be beneficiated, and a beneficiation density of the high-density beneficiation region 5 is greater than or equal to the density required for the beneficiation of the minerals to be beneficiated. The minerals to be beneficiated are fed from an upper portion of the dry beneficiation system of the gas-solid fluidized bed, and pass through the low-density beneficiation region 3, the intermediate-density beneficiation region 4, and the high-density beneficiation region 5 in sequence. Minerals with a low density that float on the upper portion of the dry beneficiation system of the gas-solid fluidized bed are referred to as light products, and minerals with a high density that sink into middle and lower portions of the dry beneficiation system of the gas-solid fluidized bed are referred to as heavy products, thus completing the beneficiation of minerals.

Sizes of both the coarse particles and the fine particles are not greater than 500 μm, the size of the coarse particles is greater than the size of the fine particles, the size of the coarse particles 2 is uniform or non-uniform, the size of the fine particles 1 is uniform or non-uniform, a density of the coarse particles 2 is not less than that of the fine particles 1, and the sizes and densities of the coarse particles and the fine particles are determined according to requirements of a beneficiation density.

Initial heights of the coarse particles 2 and the fine particles 1 are both 20-100 cm; and more preferably, the initial heights of the coarse particles 2 and the fine particles 1 are both 20-50 cm.

A minimum fluidization velocity of the coarse particles 2 is greater than a minimum fluidization velocity of the fine particles 1, and a terminal velocity of the coarse particles 2 is greater than a terminal velocity of the fine particles 1.

A fluid for fluidizing medium particles may include a series of gases such as air, carbon dioxide, and nitrogen, and preferably include air. In an actual beneficiation process, an operating gas velocity is higher than a minimum fluidization gas velocity of the coarse particles and lower than the terminal velocity of the fine particles, and the operating gas velocity is selected to be about 60% of a difference between the terminal velocity of the fine particles and the minimum fluidization velocity of the coarse particles.

A particle size of the minerals that can be beneficiated in the present invention is not greater than 300 mm, and is preferably 0.5-100 mm. A density adjustment range of the dry beneficiation system of the gas-solid fluidized bed is 1.0-2.6 g/cm$^3$, and an optimal beneficiation density is 1.3-2.0 g/cm$^3$.

A detailed description of an application process of the gas-solid fluidized bed dry beneficiation process using a beneficiation density gradient is made below in combination with an instance of coal beneficiation.

Embodiment 1

High-density beneficiation is required for coal samples, and a beneficiation density is required to be greater than 1900 kg/m$^3$. Coarse magnetite powder (with an average particle size $d_p=100$ μm, and a true density $\rho=4600$ kg/m$^3$) and fine magnetite powder (with an average particle size $d_p=45$ μm, and a true density $\rho=4600$ kg/m$^3$) are selected as medium particles. A static stacking height of the two kinds of medium particles is 30 cm, respectively. Air is selected as a gas required for fluidizing the medium particles, and is fed from a bottom of the beneficiation system. The density of coarse particles formed under the effect of an air flow is about 2100 kg/m$^3$, which is referred to as a high-density beneficiation region. The density of fine particles formed under the effect of the air flow is about 1800 kg/m³, which is referred to as a low-density beneficiation region. The density formed at a contact interface of the two kinds of particles is about 1900 kg/m³, which is referred to as an intermediate-density beneficiation region. The coal samples are preliminarily sieved, and coal samples with a diameter of 6-50 mm are used as minerals to be beneficiated. After passing through the low-density beneficiation region, minerals with a density far less than the low-density region of the bed float on an upper portion of the dry beneficiation system of the gas-solid fluidized bed. After passing through the intermediate-density beneficiation region, the preliminary beneficiated samples are further beneficiated, which helps to complete further separation of coal and gangue. After passing through the high-density beneficiation region, minerals with a large density that sink into middle and lower portions of the dry beneficiation system of the gas-solid fluidized bed are referred to as heavy products, and complete beneficiation of minerals is finally realized.

Embodiment 2

Low-density beneficiation is required for coal samples, and a beneficiation density is required to be greater than 1300 kg/m³. Quartz sand (with an average particle size $d_p$=100 μm, and a true density ρ=2600 kg/m³) and quartz sand (with an average particle size $d_p$=40 μm, and a true density ρ=2600 kg/m³) are selected as medium particles. A static stacking height of the two kinds of medium particles is 20 cm, respectively. Air is selected as a gas required for fluidizing the medium particles, and is fed from a bottom of the beneficiation system. The density of coarse particles formed under the effect of an air flow is about 1500 kg/m³, which is referred to as a high-density beneficiation region. The density of fine particles formed under the effect of the air flow is about 1300 kg/m³, which is referred to as a low-density beneficiation region. The density formed at a contact interface of the two kinds of particles is about 1100 kg/m³, which is referred to as an intermediate-density beneficiation region. The coal samples are preliminarily sieved, and coal samples with a diameter of 6-50 mm are used as minerals to be beneficiated. After passing through the low-density beneficiation region, minerals with a density far less than the low-density region of the bed float on an upper portion of the dry beneficiation system of the gas-solid fluidized bed. After passing through the intermediate-density beneficiation region, the preliminary beneficiated samples are further beneficiated, which helps to complete further separation of coal and gangue. After passing through the high-density beneficiation region, minerals with a large density that sink into middle and lower portions of the dry beneficiation system of the gas-solid fluidized bed are referred to as heavy products, and complete beneficiation of minerals is finally realized.

The above are only the preferred embodiments of the present invention, and are not intended to limit the present invention. It should be pointed out that for those of ordinary skill in the art, several improvements and modifications can be made without departing from the principle of the present invention, and these improvements and modifications should also be regarded as the protection scope of the present invention.

What is claimed is:

1. A gas-solid fluidized bed dry beneficiation process using a beneficiation density gradient, comprising: in a dry beneficiation system of a gas-solid fluidized bed, selecting coarse particles and fine particles as beneficiation medium particles, wherein an aerodynamic diameter of the coarse particles is greater than an aerodynamic diameter of the fine particles, and an aerodynamic diameter ratio of the coarse particles to the fine particles is not greater than 10; placing the coarse particles at a bottom of the dry beneficiation system of the gas-solid fluidized bed, and placing the fine particles above the coarse particles, wherein the coarse particles and the fine particles are in a completely separated state under an initial condition; under an effect of a gas flow, the coarse particles and the fine particles beginning to be fluidized to form a high-density beneficiation region and a low-density beneficiation region, respectively, and the coarse particles and the fine particles being in a mixed state at a contact interface to form an intermediate-density beneficiation region; and feeding minerals to be beneficiated from an upper portion of the dry beneficiation system of the gas-solid fluidized bed to pass through the low-density beneficiation region, the intermediate-density beneficiation region, and the high-density beneficiation region in sequence, to complete a beneficiation of the minerals.

2. The gas-solid fluidized bed dry beneficiation process using the beneficiation density gradient according to claim 1, wherein a size of the coarse particles and a size of the fine particles are not greater than 500 μm, and the size of the coarse particles is greater than the size of the fine particles, and the size of the coarse particles is uniform or non-uniform, and the size of the fine particles is uniform or non-uniform, and a density of the coarse particles is not less than a density of the fine particles.

3. The gas-solid fluidized bed dry beneficiation process using the beneficiation density gradient according to claim 1, wherein an initial height of the coarse particles and an initial height of the fine particles are 20-100 CM.

4. The gas-solid fluidized bed dry beneficiation process using the beneficiation density gradient according to claim 3, wherein the initial height of the coarse particles and the initial height of the fine particles are 20-50 CM.

5. The gas-solid fluidized bed dry beneficiation process using the beneficiation density gradient according to claim 1, wherein a minimum fluidization velocity of the coarse particles is greater than a minimum fluidization velocity of the fine particles, and a terminal velocity of the coarse particles is greater than a terminal velocity of the fine particles.

6. The gas-solid fluidized bed dry beneficiation system using the beneficiation density gradient according to claim 1, wherein an operating gas velocity is higher than a minimum fluidization gas velocity of the coarse particles and lower than a terminal velocity of the fine particles, and the operating gas velocity is 60% of a difference between the terminal velocity of the fine particles and a minimum fluidization velocity of the coarse particles.

7. The gas-solid fluidized bed dry beneficiation system using the beneficiation density gradient according to claim 1, wherein a particle size of the minerals to be beneficiated is not greater than 300 mm.

8. The gas-solid fluidized bed dry beneficiation process using the beneficiation density gradient according to claim 7, wherein the particle size of the minerals to be beneficiated is 0.5-100 mm.

9. The gas-solid fluidized bed dry beneficiation process using the beneficiation density gradient according to claim 1, wherein in the dry beneficiation system of the gas-solid fluidized bed, a density adjustment range of a beneficiation bed is 1.0-2.6 g/cm³.

10. The gas-solid fluidized bed dry beneficiation process using the beneficiation density gradient according to claim 9, wherein in the dry beneficiation system of the gas-solid fluidized bed, the density adjustment range of the beneficiation bed is 1.3-2.0 g/cm$^3$.

\* \* \* \* \*